United States Patent Office 3,565,908
Patented Feb. 23, 1971

3,565,908
2,2'-BIS(HEPTAFLUOROPROPYL)-
6,6'-BIBENZOXAZOLE
Charles D. Burton and Norman L. Madison, Midland, Mich., assignors to The Dow Chemical Company, Midland, Mich., a corporation of Delaware
No Drawing. Filed Feb. 5, 1968, Ser. No. 702,776
Int. Cl. C07d 85/48
U.S. Cl. 260—307                                      4 Claims

ABSTRACT OF THE DISCLOSURE

A novel compound 2,2'-bis(heptafluoropropyl)-6,6'-bibenzoxazole and the manner of its preparation. The compound is prepared by reacting 3,3'-dihydroxybenzidine in a solvent or carrier with methyl perfluorobutyrimidate in the presence of an aliphatic carboxylic acid as reaction promoter. Alternatively, the compound can be prepared by heating, 4,4' - bis(heptafluorobutyramido) - 3,3'-dihydroxybiphenyl in the presence of a dehydrating agent to effect cyclization. The present novel compound is suitable for use as an antiplasticizer.

BACKGROUND OF THE INVENTION

Certain types of compounds when added to polymers produce therein an increase in the modulus and tensile strength and a decrease in the elongation, for example, in films produced thereof. This effect is known as antiplasticization since just the opposite results, i.e. decreased modulus and tensile strength and increased elongation are obtained on plasticization.

It has been shown by Jackson et al, Journal of Applied Polymer Science, Vol. II, pp. 211–216 (1967) that additives which are suitable for use as antiplasticizers for polymers are those compounds which are compatible with the polymer and which (a) contain polar atoms such as halogen, nitrogen, oxygen or sulfur, (b) contain at least two nonbridged rings, (c) have a glass transition temperature greater than about minus 50° C. and (d) have one dimension less than about 5.5 A. in at least 65% of the length of the molecules.

It is a principal object of the present invention to provide a novel compound which is particularly suitable for use as an antiplasticizer in polymers and which exhibits good thermal stability.

This and other objects and advantages readily will become apparent from the detailed description presented hereinafter.

SUMMARY OF THE INVENTION

The present invention is to a new and useful compound 2,2' - bis(heptafluoropropyl) - 6,6' - bibenzoxazole corresponding to the formula

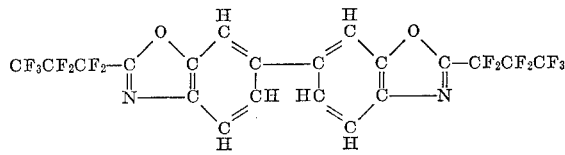

This compound ordinarily is prepared by reacting 3,3'-dihydroxybenzidine with methyl perfluorobutyrimidate in a solvent, or carrier liquid in the presence of an aliphatic carboxylic or halogenated aliphatic carboxylic acid having from 1 to about 6 carbon atoms, and preferably from 1 to about 4 carbon atoms, as a reaction promoter. The product is recovered and separated from the reaction mixture, dried and ordinarily purified by recrystallization. The 2,2'-bis(heptafluoropropyl)-6,6'-bibenzoxazole is a white crystalline solid melting at from about 147.5–148.0° C.

Alternatively, 4,4' - bis(heptafluorobutyramido) - 3,3'-dihydroxybiphenyl can be heated in the presence of a dehydrating agent, e.g. phosphorus pentoxide or polyphosphoric acid, to effect dehydration and cyclization thereby to prepare the novel compound of the present invention.

DESCRIPTION OF A PREFERRED EMBODIMENT

In one preferred embodiment of the invention usually about equivalent quantities of the dihydroxybenzidine and methyl perfluorobutyrimidate reactants in the presence of acetic, perfluoroacetic or perfluorobutyric acid as a reaction promoter are reacted with stirring in the presence of a solvent or carrier liquid at a temperature of about room temperature to about 100° C., usually at from about 40 to about 90° C., for a period of from about 2 to about 72 hours, ordinarily from about 4 to about 8 hours.

The 2,2'-bis(heptafluoropropyl)-6,6'-bibenzoxazole is separated from the reaction mixture, generally after removing a portion of the solvent or carrier by filtering, centrifuging or other liquid-solid separatory procedures.

The so-recovered product usually is washed and dried. For optimum in purity, it can be recrystallized from a suitable solvent system. The crystalline product as first prepared usually is light yellow in color. Upon subsequent recrystallization, a high purity white crystalline product in plate-like form is obtained.

Although stoichiometric quantities of reactants ordinarily are employed in this preparation of the compound the methyl perfluorobutyrimidate can be employed in greater than stoichiometric amounts without detrimentally affecting the reaction or product formation. In any event the aliphatic carboxylic acid reaction promoter at a minimum should be present in a molar quantity equal to that of the methyl perfluorobutyrimidate. The acid reaction promoter can be present in excess of this amount; in fact, if desired this material also can serve as a solvent or carrier for the reactants used in the process.

Solvents or carrier liquid suitable for use in preparing the present novel compound can be selected from any of a wide variety of liquids including, for example (1) organic polar aprotic materials such as aliphatic ethers exemplified by diethylene glycol dimethyl ether, ethylene glycol dimethyl ether, dioxane, (2) polar protic solvents such as the fluorinated alcohols, e.g. hexafluoroisopropanol, (3) halogenated hydrocarbons such as carbon tetrachloride, chloroform, methylene chloride and the like. The selection of a given liquid is not critical so long as it exhibits a solubility for at least a portion of the reactants and is inert to or does not detrimentally react with the reactants and product compound.

The quantity of solvent or carrier to be employed is not critical. Excessively large volumes of solvent are not desired since these entail the use of large reactors and material handling transport equipment and systems.

Generally an inert atmosphere, e.g., substantially anhydrous nitrogen, is employed in the preparation of the compound. This assures optimum in purity and product yield.

Alternatively, 3,3'-dihydroxybenzidine can be reacted with perfluorobutyryl chloride in the presence of a solvent or carrier to provide the corresponding 4,4'-bis(perfluorobutyramido)-3,3'-dihydroxybiphenyl. Heating this material in the presence of a dehydrating agent, e.g., polyphosphoric acid, in an inert atmosphere at a temperature sufficient to effect dehydration gives the corresponding 2,2'-bis(heptafluoropropyl) - 6,6' - bibenzoxazole. Usually temperatures of from about 100 to about 300° C., ordinarily about 200° C., and heating times of at least about several hours, ordinarily from about 2 to 72 hours or more are used.

EXAMPLE 1

About 10.5 grams (0.0487 gram mole) of 3,3'-dihydroxybenzidine in 200 milliliters of dioxane was charged to a 500 milliliter, 3-neck flask equipped with a stirrer, addition tube and reflux condenser. A mixture of perfluorobutyric acid, 21.50 grams (0.1003 gram mole), and methyl perfluorobutyrimidate, 22.80 grams (0.1003 gram mole) was added dropwise with stirring to this solution.

The reaction mass was heated under a nitrogen atmosphere of from about 50 to about 55° C. for about 4 hours. The external heating was stopped after this time. Soon after the initiation of the external heat, all of the solids went into solution and the color of the reaction mixture darkened.

The reaction mixture was stirred overnight (~18 hours) at room temperature under a nitrogen atmosphere. Following this period, the condenser was replaced with a still head and about 100 milliliters of liquid removed from the reactor. This proved to be dioxane. The reactor was cooled to 20° C. whereupon a solid product precipitated therein. This was removed by filtration; this solid product was washed with a small amount of water and dried under a low absolute pressure at about 50° C. for two hours. The resulting product was a light yellow material and about 15.95 grams was obtained.

The filtrate from the reaction mixture was poured into 300 milliliters of deionized water. A precipitate formed. This was separated by filtering, washed with water and dried at a low absolute pressure at 50° C. for two hours. The resulting darker yellow solid product weighed 10.56 grams, giving a total weight of crude product of 26.51 grams, indicating a product yield of 95% of theoretical. The melting point of the first crop of product was about 145° C. The infrared spectrum of this material showed no C=O, —OH or N—H groupings.

About 13.7 grams of the crude product were recrystallized in a 500 milliliter Erlenmeyer flask using 220 milliliters of acetone. The mixture was heated on a steam bath and gave a clear amber solution as the crude product dissolved. About 3.4 grams of Norit charcoal was added to the solution and the mixture warmed for 15 minutes. The hot mixture was filtered twice to insure removal of the charcoal after which about 34 milliliters of deionized water was added to the boiling filtrate. Upon cooling to room temperature, white crystals precipitated in the flask. The crystals were separated by filtration, washed with cold 80% acetone and dried at a low absolute pressure at 50° C. The white crystalline product had a melting point of 147.5–148.0° C.

Chemical elemental analysis gave C—41.5%; H—0.99%; F—46.1%; N—4.74%; O—6.67% (by difference).

Theoretical calculated analysis for 2,2'-bis-(heptafluoropropyl)-6,6'-bibenzoxazole is C—41.6%; H—1.04%; F—46.4%; N—4.8%; O—6.12%.

The infrared spectrum, nuclear magnetic reasonance and mass spectral analyses all supported and confirmed the assigned structure.

The largest ion detected by mass spectral analysis was 572; the molecular weight of the compound is 572.

Further, on the basis of calculated bond lengths, this compound exhibits one dimension less than about 5.5 A.

Incorporating this compound at a concentration up to about 30 percent into a fluorinated polymer serves to increase the modulus and tensile strength of films prepared from such a polymer as well as to decrease the elongation of the material. This indicates that the compound is suitable for use as an antiplasticizer in polymers.

In a manner similar to that described for the foregoing example, 3,3'-dihydroxybenzidene and methyl perfluorobutyrimidate upon reaction in perfluoroisopropanol in the presence of acetic acid or perfluoroacetic acid as a reaction promoter yields 2,2'-bis(heptafluoropropyl)-6,6'-bibenzoxazole.

EXAMPLE 2

About 1.95 grams of 3,3'-dihydroxybenzidine in 25 milliliters of pyridine was charged to a 50 milliliter flask equipped with an adapter containing a stopcock. The flask and its contents was cooled to about minus 196° C. and the flask evacuated to an absolute pressure of less than 10 microns mercury. Perfluorobutyryl chloride, 4.34 grams, was measured by expansion into the vacuum line and condensed into the cold reaction flask. The flask was closed and allowed to warm to room temperature overnight. A purple colored slurry resulted; this was stirred for two hours and poured into 150 milliliters of deionized water. The resulting solid product was separated by filtration, washed with water and vacuum dried at about 50° C.

The product was shown by infrared analysis to contain two compounds. Extraction of the product mixture with hot benzene in a Soxhlet extractor separated one of the components in small amounts. This was subsequently identified as 4,4'-bis(heptafluorobutyramido)-3,3'-dimethoxybiphenyl. The remaining product was heated to 200° C. to remove purple color therefrom and recrystallized from acetone. This product was shown by analysis to be the desired 4,4'-bis(heptafluorobutyramido)-3,3'-dihydroxybiphenyl.

About 1.7 grams of this latter compound and about 10 grams of commercial polyphosphoric acid were charged to a horizontal sublimer and heated under a nitrogen atmosphere at about 200° C. for about 20 hours. This amount of polyphosphoric acid is in excess of that required for dehydration of the 4,4'-bis(heptafluorobutyramido)-3,3'-dihydroxybiphenyl. Large white crystals slowly collected in the cooling chamber of the sublimer over this period and the polyphosphoric acid turned black. The white crystals were collected (1.09 gram) and upon analysis and a comparison of melting points and other properties with the product obtained in Example 1 proved to be 2,2'-bis(heptafluoropropyl) - 6,6'-bibenzoxazole. The product yield was about 59%.

Various modifications can be made in the present invention without departing from the spirit or scope thereof for it is understood that we limit ourselves only as defined in the appended claims.

We claim:

1. A process for preparing 2,2'-bis(heptafluoropropyl) 6,6'-bibenzoxazole which comprises:
   (a) reacting in a solvent at a maximum temperature of about 100° C. for a period of from about 2 to about 72 hours 3,3'-dihydroxybenzidine and methyl perfluorobutyrimidate in the presence of an aliphatic carboxylic acid reaction promoter, said reaction promoter being a member selected from the group consisting of acetic acid, perfluoroacetic acid and perfluorobutyric acid.
   (b) separating said 2,2'-bis(heptafluoropropyl)6,6'-bibenzoxazole from the reaction mass, and
   (c) recovering said 2,2'-bis(heptafluoropropyl)-6,6'-bibenzoxazole.

2. The process as defined in claim 1 wherein said 3,3'-dihydroxybenzidine and methyl perfluorobutyrimidate are employed in about stoichiometric quantities as required for preparation of said 2,2' - bis(heptafluoropropyl)-6,6'-bibenzoxazole and said acid reaction promoter is present at a minimum in a molar quantity equal to that of said methyl perfluorobutyrimidate.

3. The process as defined in claim 1 wherein the reaction is carried out at a temperature of from about 40 to about 90° C. for a period of from about 4 to about 8 hours.

4. The process as defined in claim 1 wherein an inert atmosphere is employed.

References Cited

FOREIGN PATENTS 1,087,779  10/1967  Great Britain.

OTHER REFERENCES

Gitina et al., Chem. Abst. 66, 10869b (1967), Abstract of Vysokomolekul. Soedin, 8(9) 1535–8, 1966.

Elderfield—Vol. 5 of "Heterocyclic Compounds," 1957, Wiley, 1957.

ALEX MAZEL, Primary Examiner

R. V. RUSH, Assistant Examiner

U.S. Cl. X.R.

260—30.4

PO-1050
(5/69)

UNITED STATES PATENT OFFICE
CERTIFICATE OF CORRECTION

Patent No. 3,565,908        Dated 23 February 1971

Inventor(s) Charles D. Burton and Norman L. Madison

It is certified that error appears in the above-identified patent and that said Letters Patent are hereby corrected as shown below:

At page 1 after the phrase "Background of the Invention" insert the legend:

The invention herein described was made in the course of or under a contract or subcontract thereunder with the Department of the Air Force.

Signed and sealed this 17th day of August 1971.

(SEAL)
Attest:

EDWARD M. FLETCHER, JR.
Attesting Officer

WILLIAM E. SCHUYLER, JR.
Commissioner of Patent